US011981817B2

(12) United States Patent
Tong et al.

(10) Patent No.: US 11,981,817 B2
(45) Date of Patent: May 14, 2024

(54) HYDROGEN SULFIDE SCAVENGERS FOR ASPHALT

(71) Applicant: ECOLAB USA INC., St. Paul, MN (US)

(72) Inventors: Xiaowei Tong, Sugar Land, TX (US); Jennifer L. Sorrells, Houston, TX (US); Elizabeth Balapitiya, Missouri City, TX (US); Ravindranath Mukkamala, Sugar Land, TX (US)

(73) Assignee: ECOLAB USA Inc., St. Paul, MN (US)

( * ) Notice: Subject to any disclaimer, the term of this patent is extended or adjusted under 35 U.S.C. 154(b) by 690 days.

(21) Appl. No.: 16/801,726

(22) Filed: Feb. 26, 2020

(65) Prior Publication Data
US 2020/0277498 A1 Sep. 3, 2020

Related U.S. Application Data

(60) Provisional application No. 62/812,108, filed on Feb. 28, 2019.

(51) Int. Cl.
C08J 3/20 (2006.01)
C08L 95/00 (2006.01)

(52) U.S. Cl.
CPC ............... C08L 95/00 (2013.01); C08J 3/203 (2013.01); C08J 2395/00 (2013.01); C08L 2555/32 (2013.01); C08L 2555/50 (2013.01); C08L 2555/60 (2013.01)

(58) Field of Classification Search
CPC .................... C08L 95/00; C08J 3/20
USPC ........................................................ 523/210
See application file for complete search history.

(56) References Cited

U.S. PATENT DOCUMENTS

| | | | |
|---|---|---|---|
| 4,987,186 A | 1/1991 | Akiyama et al. | |
| 4,987,228 A | 1/1991 | Cantatore et al. | |
| 5,000,835 A | 3/1991 | Taylor et al. | |
| 5,213,680 A | 5/1993 | Kremer et al. | |
| 5,314,672 A | 5/1994 | Vasil | |
| 7,264,786 B2 | 9/2007 | Pakulski et al. | |
| 7,438,877 B2 | 10/2008 | Salma et al. | |
| 7,495,045 B2 | 2/2009 | Buras et al. | |
| 7,645,820 B2 | 1/2010 | Buras et al. | |
| 7,713,345 B2 | 5/2010 | Maldonado et al. | |
| 8,153,705 B2 | 4/2012 | Gillard et al. | |
| 8,202,922 B2 | 6/2012 | Botel et al. | |
| 8,211,294 B1 | 7/2012 | Zaid et al. | |
| 8,241,491 B1 | 8/2012 | Zaid et al. | |
| 8,246,813 B2 | 8/2012 | Compton et al. | |
| 8,734,637 B2 | 5/2014 | Taylor | |
| 9,150,707 B2 | 10/2015 | Schroeder | |
| 9,610,535 B2 | 4/2017 | Boday et al. | |
| 9,932,478 B2 | 4/2018 | Mouazen et al. | |
| 2005/0153846 A1 | 7/2005 | Gatlin | |
| 2005/0238556 A1 | 10/2005 | Pakulski et al. | |
| 2006/0116450 A1* | 6/2006 | Buras | E01C 7/18 524/68 |
| 2008/0090945 A1 | 4/2008 | Langrick et al. | |
| 2009/0097881 A1 | 4/2009 | Kondoh et al. | |
| 2009/0145330 A1* | 6/2009 | Draper | C08J 5/005 106/274 |
| 2009/0149577 A1 | 6/2009 | Butler et al. | |
| 2009/0206003 A1* | 8/2009 | Draper | C08L 95/00 208/23 |
| 2011/0022055 A1 | 1/2011 | Quintin et al. | |
| 2011/0160355 A1 | 6/2011 | Martin | |
| 2011/0306729 A1 | 12/2011 | Dreessen et al. | |
| 2012/0017503 A1 | 1/2012 | Riggs et al. | |
| 2014/0171721 A1 | 6/2014 | Bertrand, III | |
| 2014/0209304 A1 | 7/2014 | Reed et al. | |
| 2015/0104579 A1 | 4/2015 | Hedrick et al. | |
| 2015/0218342 A1* | 8/2015 | Martin | C08K 5/0008 106/284.4 |
| 2015/0360173 A1 | 12/2015 | Boday et al. | |
| 2016/0289450 A1 | 10/2016 | Mouazen et al. | |
| 2017/0015811 A1 | 1/2017 | Martin et al. | |
| 2017/0022109 A1 | 1/2017 | Poland et al. | |
| 2017/0260095 A1 | 9/2017 | Song et al. | |
| 2017/0306129 A1 | 9/2017 | Song et al. | |
| 2018/0100096 A1 | 4/2018 | Wylde | |
| 2018/0163021 A1* | 6/2018 | Tong | C08K 3/32 |
| 2018/0163050 A1 | 6/2018 | Mouazen et al. | |

FOREIGN PATENT DOCUMENTS

| | | |
|---|---|---|
| AR | 059003 | 3/2008 |
| CN | 102618202 | 8/2012 |

(Continued)

OTHER PUBLICATIONS

International Search Report and Written Opinion for related International Application No. PCT/US2015/015461, dated May 22, 2015 (8 pages).
International Search Report and Written Opinion for related Internatonal Application No. PCT/US2017/063760, dated Feb. 23, 2018, 14 pages.
Pankratov, V.A., et al., "Polytriazines," Russian Chemical Reviews, 41(1):66-82 (1972).
Anonymous. "The Use and Performance of Asphalt Binder Modified with Polyphosphoric Acid (PPA)," TechBrief FHWA-HIF-12-030, Mar. 2012, 7 pages.

(Continued)

Primary Examiner — Deve V Hall
(74) Attorney, Agent, or Firm — Eric D. Babych; Barnes & Thornburg LLP

(57) ABSTRACT

Scavenging compounds and compositions useful in reducing sulfide emissions from asphalt, such as polymer-treated asphalt, are disclosed. The scavenger compositions may include sulfide-scavenging agents. The scavenger compositions also include a metal-containing compound and optionally a solvent. Any of the compositions, sulfide-scavenging agents and metal-containing compounds may be anhydrous. Methods of using the compositions to reduce hydrogen sulfide emissions from asphalt are also disclosed.

19 Claims, No Drawings

(56) References Cited

FOREIGN PATENT DOCUMENTS

| | | | | |
|---|---|---|---|---|
| CN | 104031355 | | 9/2014 | |
| CN | 105073943 | A * | 11/2015 | ............. C10G 21/16 |
| EP | 0636675 | A2 | 2/1955 | |
| EP | 0121377 | A1 | 10/1984 | |
| EP | 2262856 | | 12/2010 | |
| EP | 3121231 | | 1/2017 | |
| EP | 3710436 | A1 | 9/2020 | |
| GB | 2306171 | | 4/1997 | |
| KR | 1462545 | | 11/2014 | |
| WO | 9201481 | | 2/1992 | |
| WO | WO-9958600 | A1 * | 11/1999 | ............. C08K 3/32 |
| WO | 201507115 | | 5/2015 | |
| WO | 2015116864 | | 8/2015 | |
| WO | 2015123329 | | 8/2015 | |
| WO | 2016191672 | A1 | 12/2016 | |
| WO | 2017120430 | A1 | 7/2017 | |
| WO | 2018122680 | | 7/2018 | |

OTHER PUBLICATIONS

April, et al. "Polyphosphoric Acid Modification of Asphalt Binders, A Workshop," Apr. 7-8, 2009, Minneapolis, MN, Transportation Research Circular E-C160. URL: http://onlinepubs.trb.org/onlinepubs/circulars/ec160.pdf, retrieved from Internet on Mar. 4, 2015, 174 pages.

Bakke, et al. "Hydrolysis of 1,3,5-Tris(2-hydroxyethyl)hexahydro-s-triazine and Its Reaction with $H_2S$," Industrial & Engineering Chemistry Research, 40(26), (2001), pp. 6051-6054.

Kodrat, et al. "Comparison of Polyphosphoric Acid-Modified Asphalt Binders with Straight and Polymer-Modified Materials," Transportation Research Record 1998(1), (2007), pp. 47-55.

Lin et al. "Performance characteristics of Terminal Blend rubberized asphalt with SBS and polyphosphoric acid," Construction and Building Materials, 141, (2017), pp. 171-182.

Liu et al. "Laboratory performance of warm mix asphalt binder containing polyphosphoric acid," Construction and Building Materials, 106, (2016), pp. 218-227.

Platonov, V.A. "Properties of Polyphosphoric Acid," Fibre Chemistry, 32(5), (2000), pp. 325-329.

Polacco, et al. "A review of the fundamentals of polymer-modified asphalts: Asphalt/polymer interactions and principles of compatibility," Advances in Colloid and Interface Science, 224, (2015), pp. 72-112.

Zhang, et al. "The research for SPS and SBR compound modified asphalts with polyphosphoric acid and sulfur," Construction and Building Materials, 43, (2013), pp. 461-468.

International Preliminary Report on Patentability, PCT/US2020/019866, dated Aug. 25, 2021, 16 pages.

International Search Report and Written Opinion for International Application No. PCT/US 2022/039051, dated Oct. 27, 2022.

Fan Zhang et al., "Performance and theoretical study on corrosion inhibition of 2-(4-pyridyl)-benzimidazole for mild steel in hydrochloric acid", Corrosion Science, vol. 61, (Aug. 2012), pp. 1-9.

* cited by examiner

HYDROGEN SULFIDE SCAVENGERS FOR ASPHALT

TECHNICAL FIELD

The present disclosure relates generally to scavengers of sulfur-based species, and more particularly to compounds that scavenge hydrogen sulfide and/or mercaptan vapors released from asphalt.

BACKGROUND

Asphalt is commonly used in the construction and paving of roads. Asphalt is a mixture of aggregate material, such as sand, gravel, and crushed stone, with hot bitumen. The bitumen coats the aggregate material to give the asphalt, which may be spread as a uniform layer upon a road bed and compacted and smoothed with heavy rolling equipment.

Asphalt invariably contains sulfur. The amount of sulfur will depend on the origin of the crude oil, as well as the processes used to refine the crude oil, into asphalt. The sulfur may exist in different forms. For example, sulfur may be in the form of hydrogen sulfide. Hydrogen sulfide, or dihydrogen sulfide, is a chemical compound with the formula $H_2S$. It is a colorless, poisonous, flammable gas with the characteristically regarded foul odor.

Hydrogen sulfide may be released from asphalt, in particular when the asphalt is heated to a certain temperature. For example, hydrogen sulfide results from the dehydrogenation reactions that occur between bitumen and sulfur at the hot mixing temperatures, for example temperatures greater than 140° C. Hydrogen sulfide emissions are regulated. Therefore, there exists a need to reduce the amount of hydrogen sulfide in asphalt.

A variety of polymers are used to treat/modify asphalt. The degree to which a polymer improves an asphalt's properties depends on the compatibility of the polymer and the asphalt; e.g., a polymer that does not separate in a mixture of asphalt and polymer during storage. Highly compatible or compatibilized polymers are more effective in providing property improvements. An extensive range of additives has been used for the purpose of "crosslinking" polymers and asphalts, thereby rendering the mixture compatible. For example, sulfur is a well-known crosslinking agent.

Polyphosphoric acid (PPA) ($H_{n+2}P_nO_{3n+1}$) is a polymer of orthophosphoric acid ($H_3PO_4$). PPA offered commercially is a mixture of orthophosphoric acid with pyrophosphoric acid, triphosphoric and higher acids. Superphosphoric acid is a similar mixture sold at 105% $H_3PO_4$. Other grades of phosphoric acid may contain water, but are not typically used in asphalt modification. This eliminates issues of foaming and corrosion at the refinery or terminal. PPA's major applications are surfactant production, water treatment, pharmaceutical synthesis, pigment production, flame proofing, metals finishing and asphalt modification.

PPA has been widely used in refineries to modify the performance properties of asphalt. Due to its strong acidity, however, the PPA would revert most $H_2S$ scavengers and allow undesirable release the hydrogen sulfide from scavenger treated asphalt.

BRIEF SUMMARY

The present disclosure relates generally to scavengers of sulfur-based species and methods of using the scavengers. In some embodiments, the disclosure provides a composition for reducing hydrogen sulfide emission from asphalt. The composition comprises a metal-containing compound; and a sulfide-scavenging agent selected from the group consisting of hexamethylenetetramine and a 1,3,5-triazine derivative of Formula I:

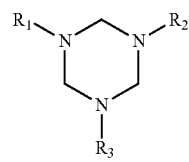

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy.

The composition may further comprise asphalt. The asphalt may be polymer-treated asphalt. The asphalt may comprise PPA.

In some embodiments, the sulfide-scavenging agent comprises Formula I, and each of $R^1$, $R^2$, and $R^3$ is independently selected from straight or branched $C_6$-$C_{30}$ alkyl, hydroxyl substituted straight or branched $C_6$-$C_{30}$ alkyl, and straight or branched $C_6$-$C_{30}$ alkoxy substituted with straight or branched $C_1$-$C_{30}$ alkoxy. In certain embodiments, the sulfide-scavenging agent comprises Formula I, and each of $R^1$, $R^2$, and $R^3$ is selected from $C_1$-$C_9$ straight or branched alkyl. In some embodiments, the sulfide-scavenging agent comprises Formula I, and each of $R^1$, $R^2$, and $R^3$ is the same substituent, such as —$CH_2CH_2OH$. In certain embodiments, the sulfide-scavenging agent is hexamethylenetetramine.

In some embodiments, the composition further comprises a polar solvent. The polar solvent may be selected from the group consisting of diethylene glycol, 2-butoxyethanol, propylene glycol, monoethanol amine, and any combination thereof.

The composition may comprise about 10 weight % to about 90 weight % of the sulfide-scavenging agent, about 1 weight % to about 50 weight % of the metal-containing compound, and optionally about 10 weight % to about 90 weight % of a solvent. Additionally, the composition may comprise about 30 weight % to about 60 weight % of the sulfide-scavenging agent, about 1 weight % to about 30 weight % of the metal-containing compound, and optionally about 30 weight % to about 60 weight % of a solvent. Further, the composition may comprise about 45 weight % of the sulfide-scavenging agent, about 10 weight % of the metal-containing compound, and optionally about 45 weight % of a solvent.

In some embodiments, the asphalt comprises about 0.1 weight % to about 10 weight % of the polymer, or about 0.1 weight % to about 5 weight % of the polymer, or about 1 weight % of the polymer.

The metal of the metal-containing compound may be selected from the group consisting of Cu (II), Zn (II), Fe (II), Ni (II), Co (II), Mn (II), Ca (II), Mg (II), and any combination thereof. The metal-containing compound may comprise a member selected from the group consisting of a metal carboxylate, a metal oxide, a metal carbonate, and any combination thereof. The metal-containing compound may be selected from the group consisting of copper acetate, copper bis-glycinate, zinc acetate, zinc bis-glycinate, zinc octoate, zinc 2-ethylhexanoate, copper 2-ethylhexanoate, iron 2-ethylhexanoate and any combination thereof.

The composition, the metal-containing compound and/or the sulfide-scavenging agent may be anhydrous.

The present disclosure also provides a method of reducing hydrogen sulfide emission from asphalt. The method comprises combining asphalt with a composition, the composition comprising a metal-containing compound and a sulfide-scavenging agent selected from the group consisting of hexamethylenetetramine and a 1,3,5-triazine derivative of Formula I:

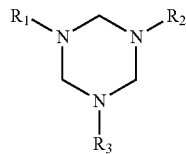

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy.

In some embodiments, the sulfide-scavenging agent comprises Formula I, and each of $R^1$, $R^2$, and $R^3$ is independently selected from straight or branched $C_6$-$C_{30}$ alkyl, hydroxyl substituted straight or branched $C_6$-$C_{30}$ alkyl, and straight or branched $C_6$-$C_{30}$ alkoxy substituted with straight or branched $C_1$-$C_{30}$ alkoxy. In some embodiments, the sulfide-scavenging agent comprises Formula I, and each of $R^1$, $R^2$, and $R^3$ is the same substituent, such as —CH$_2$CH$_2$OH, $R^2$ is —CH$_2$CH$_2$OH, and $R^3$ is —CH$_2$CH$_2$OH.

In some embodiments, the sulfide-scavenging agent is hexamethylenetetramine. In some embodiments, the composition comprises a polar solvent. In some embodiments, the asphalt is polymer-treated asphalt. In some embodiments, the asphalt comprises PPA.

In accordance with the methods disclosed herein, the metal may be selected from the group consisting of Cu (II), Zn (II), Fe (II), Ni (II), Co (II), Mn (II), Ca (II), Mg (II), and any combination thereof. The metal-containing compound may be selected from the group consisting of copper acetate, copper bis-glycinate, zinc acetate, zinc bis-glycinate, zinc octoate, zinc 2-ethylhexanoate, copper 2-ethylhexanoate, iron 2-ethylhexanoate and any combination thereof. In some embodiments, the metal-containing compound comprises copper acetate.

The composition, the metal-containing compound, and/or the sulfide-scavenging agent may be anhydrous.

The present disclosure also provides a composition, comprising asphalt; a metal-containing compound; and a sulfide-scavenging agent selected from the group consisting of hexamethylenetetramine and a 1,3,5-triazine derivative of Formula I:

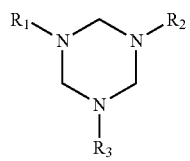

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy. The metal-containing compound may be copper acetate. The composition, the metal-containing compound, and/or the sulfide-scavenging agent may be anhydrous.

The present disclosure also provides for the use of any composition disclosed herein in a method of reducing hydrogen sulfide emission from asphalt.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims

DETAILED DESCRIPTION

The present disclosure relates to sulfide-scavenging compositions for use with asphalt. The compositions are particularly efficient at reducing hydrogen sulfide emissions of asphalt, including polymer-treated asphalt, such as PPA-treated asphalt. The present disclosure relates to compositions comprising a metal-containing compound, a sulfide-scavenging agent, and optionally asphalt, including polymer-treated asphalt, such as PPA-treated asphalt. The present disclosure also relates to methods of using the compositions to reduce hydrogen sulfide emission from asphalt, including polymer-treated asphalt, such as PPA-treated asphalt.

In accordance with the present disclosure, the term "alkyl" as used herein, refers to a hydrocarbon radical with a defined number of carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 carbons). Branched alkyl groups include, but are not limited to, sec-butyl, tert-butyl, isobutyl, isopentyl, neopentyl, 1-methylbutyl, 2-methylbutyl, 1,1-dimethylpropyl, 1,2-dimethylpropyl, 1-ethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl, 1-ethylbutyl, 2-ethylbutyl, 1-methylhexyl, 2-methylhexyl, 3-methylhexyl, 4-methylhexyl, 5-methylhexyl, 1,1-dimethylpentyl, 1,2-dimethylpentyl, 1,3-dimethylpentyl, 1,4-dimethylpentyl, 2,2-dimethylpentyl, 2,3-dimethylpentyl, 2,4-dimethylpentyl, 3,3-dimethylpentyl, 3,4-dimethylpentyl, 4,4-dimethylpentyl, 1,1,2-trimethylbutyl, 1,1,3-trimethylbutyl, 1,2,2-trimethylbutyl, 1,2,3-trimethylbutyl, 1,3,3-trimethylbutyl, 2,2,3-trimethylbutyl, 2,3,3-trimethylbutyl, 1,1,2,2-tetramethylpropyl, 1-ethylpentyl, 2-ethylpentyl, 3-ethylpentyl, 1-ethyl-1-methylbutyl, 1-ethyl-2-methylbutyl, 1-ethyl-3-methylbutyl, 2-ethyl-1-methylbutyl, 2-ethyl-2-methylbutyl, 2-ethyl-3-methylbutyl, 1-propylbutyl, 1,1-diethylpropyl, etc.

In some embodiments, the number of carbon atoms for the alkyl group is between 6 and 30. In some embodiments, the number of carbon atoms for the alkyl group is between 6 and 20. In some embodiments, the number of carbon atoms for the alkyl group is between 6 and 15. In some embodiments, the number of carbon atoms for the alkyl group is between 6 and 10. In some embodiments, the number of carbon atoms for the alkyl group is between 6 and 8.

The term "alkoxyl" as used herein, refers to a ether radical with a defined number of carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 carbons). Branched alkyl groups include, but are not limited to, sec-butoxy, tert-butoxy, isobutoxy, isopentoxy, neopentoxy, 1-methylbutoxy, 2-methoxybutoxy, 1,1-dimethylpropoxy, 1,2-dimethylpropoxy, 1-ethylpropoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1,1,2-trimethylpropoxy, 1,2,2-trimethylpropoxy, 1-ethylbutoxy, 2-ethylbutoxy, 1-methylhexoxy, 2-methylhexoxy, 3-methylhexoxy, 4-methylhexoxy, 5-methylhexoxy, 1,1-dimethylpentoxy, 1,2-dimethylpentoxy, 1,3-dimethylpentoxy, 1,4-dimethylpentoxy, 2,2-dimethylpentoxy, 2,3-dimethylpentoxy, 2,4-dimethylpentoxy, 3,3-dimethylpentoxy, 3,4-dimethylpentoxy, 4,4-dimethylpentoxy, 1,1,2-trimethylbutoxy, 1,1,3-trimethylbutoxy, 1,2,2-trimethylbutoxy, 1,2,3-trimethylbutoxy, 1,3,3-trimethylbutoxy, 2,2,3-trimethylbutoxy, 2,3,3-trimethylbutoxy, 1,1,2,2-tetramethylpropoxy, 1-ethylpentoxy, 2-ethylpentoxy, 3-ethylpentoxy, 1-ethyl-1-methylbutoxy, 1-ethyl-2-methylbutoxy, 1-ethyl-3-methylbutoxy, 2-ethyl-1-methylbutoxy, 2-ethyl-2-methylbutoxy, 2-ethyl-3-methylbutoxy, 1-propylbutoxy, 1,1-diethylpropoxy, etc.

In some embodiments, the number of carbon atoms for the alkyl portion of the alkoxy group is between 6 and 30. In some embodiments, the number of carbon atoms for the alkyl group is between 6 and 20. In some embodiments, the number of carbon atoms for the alkyl group is between 6 and 15. In some embodiments, the number of carbon atoms for the alkyl group is between 6 and 10. In some embodiments, the number of carbon atoms for the alkyl group is between 6 and 8.

As used herein, the term "asphalt" refers to any of a variety of materials that are solid or semisolid at room temperature and which gradually liquefy when heated, and in which the predominant constituents are naturally occurring bitumens (or kerogens) or which are bitumen like materials obtained as residue in petroleum refining. It is expressly contemplated that asphalt as used herein includes what ASTM defines as asphalt: a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by the ASTM as a class of black or dark-colored cementitious substances, natural or manufactured, composed principally of high molecular weight hydrocarbons, of which asphalts, tars, pitches and asphaltenes are typical. The ASTM further classifies asphalts or bituminous materials as solids, semi-solids, or liquids using a penetration test for consistency or viscosity. In this classification, solid materials are those having a penetration of not more than 1 millimeter when a load of 100 grams is applied for 5 seconds while at 25° C., and semi-solids are those having a penetration of more than 1 millimeter when a load of 50 grams is applied for 5 seconds while at 25° C. Semi-solid and liquid asphalts predominate in commercial practice today. For example, any asphalt bottoms fraction, as well as naturally occurring asphalts, tars and pitches and may be used interchangeably herein with the term "bitumen." The term "asphaltic concrete" means asphalt used as a binder with appropriate aggregate added, typically for use as a paving material.

The term "bottoms fraction" refers to a crude fraction having a flash point of about 70° F. or greater.

The term "anhydrous" as used herein, refers to compositions where the amount of water present is less than about 10 weight %, such as less than about 7 weight %, less than about 5 weight %, less than about 4 weight %, less than about 3 weight %, less than about 2 weight %, less than about 1 weight %, or about 0 weight %.

Compositions

The compositions disclosed herein comprise a metal-containing compound and a sulfide-scavenging agent. In some embodiments, the compositions comprise asphalt, which could be polymer-treated asphalt, such as PPA-treated asphalt. The compositions may further comprise a solvent. In some embodiments, the composition is anhydrous. In some embodiments, the metal-containing compound is anhydrous. In some embodiments, sulfide-scavenging agent is anhydrous.

The sulfide-scavenging agent is selected from the group consisting of hexamethylenetetramine and 1,3,5-triazine derivatives of Formula I

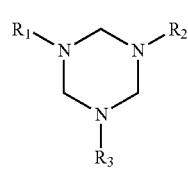

Formula I where each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, straight or branched $C_1$-$C_{30}$ alkyl substituted with straight or branched $C_1$-$C_{30}$ alkoxy. In some embodiments, the 1,3,5-triazine derivative is anhydrous.

In some embodiments, the sulfide-scavenging agent is hexamethylenetetramine (HMTA), which has the structure:

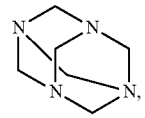

Hexamethylenetetramine

In some embodiments, the sulfide-scavenging agent is a 1,3,5-triazine derivative of Formula I

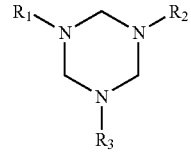

having the substituents for $R^1$, $R^2$, and $R^3$ defined above. In some embodiments, the 1,3,5-triazine is anhydrous. In some embodiments, each of $R^1$, $R^2$, and $R^3$ is independently selected from hydrogen or straight or branched $C_1$-$C_{30}$ alkyl. In some embodiments, each of each of $R^1$, $R^2$, and $R^3$ is independently selected from straight or branched $C_6$-$C_{30}$ alkyl. In some embodiments, each of $R^1$, $R^2$, and $R^3$ is $CH_2CH_2OH$. In some embodiments, each of $R^1$, $R^2$, and $R^3$ is H.

In some embodiments, each of $R^1$, $R^2$, and $R^3$ is independently hydroxyl substituted straight or branched $C_1$-$C_{30}$ alkyl. In some embodiments, each of $R^1$, $R^2$, and $R^3$ is independently hydroxyl substituted straight or branched $C_6$-$C_{30}$ alkyl.

In some embodiments, each of $R^1$, $R^2$, and $R^3$ is independently straight or branched $C_1$-$C_{30}$ alkyl substituted with straight or branched $C_1$-$C_{30}$ alkoxy. In some embodiments, each of $R^1$, $R^2$, and $R^3$ is independently straight or branched $C_6$-$C_{30}$ alkyl substituted with straight or branched $C_1$-$C_{30}$ alkoxy. In some embodiments, each of $R^1$, $R^2$, and $R^3$ is independently straight or branched $C_6$-$C_{30}$ alkyl substituted with straight or branched $C_6$-$C_{30}$ alkoxy.

In some embodiments, each of $R^1$, $R^2$, and $R^3$ is the same. In some embodiments, $R^1$ is different from $R^2$ and $R^3$. In some embodiments, $R^1$ and $R^2$ are the same. In some embodiments, $R^1$ and $R^2$ are the same and are also different from $R^3$. In some embodiments, $R^1$ is different from $R^2$ and $R^3$, and $R^2$ is different from $R^3$.

The metal-containing compound of the presently disclosed compositions is not particularly limited. In some embodiments, the metal-containing compound comprises a metal carboxylate, a metal oxide, a metal carbonate, and any combination thereof.

For example, in some embodiments, the metal-containing compound may comprise one or more metal carboxylates, such as a copper carboxylate, a zinc carboxylate, an iron carboxylate, and any combination thereof. In some embodiments, the metal-containing compound may comprise one or more metal carboxylates and one or more metal oxides. In some embodiments, the metal-containing compound may comprise one or more metal carboxylates, one or more metal oxides, and one or more metal carbonates. In some embodiments, the metal-containing compound may comprise one or more metal carboxylates and one or more metal carbonates.

In additional embodiments, the metal-containing compound may comprise one or more metal oxides, such as zinc oxide, copper oxide, iron oxide, and any combination thereof. In some embodiments, the metal-containing compound may comprise one or more metal oxides and one or more metal carbonates. In other embodiments, the metal-containing compound may comprise one or more metal carbonates, such as zinc carbonate, iron carbonate, copper carbonate, and any combination thereof.

The metal of the metal-containing compound is not particularly limited. In some embodiments, the metal comprises a divalent ion selected from, but not limited to, Cu (II), Zn (II), Fe (II), Ni (II), Co (II), Mn (II), Ca (II), Mg (II), and any combination thereof. In some embodiments, the metal-containing compound comprises a member selected from the group consisting of copper, zinc, iron, and any combination thereof.

In some embodiments, the metal-containing compound comprises copper acetate, copper bis-glycinate, zinc acetate, zinc bis-glycinate, zinc 2-ethylhexanoate, copper 2-ethylhexanoate, iron 2-ethylhexanoate and any combination thereof. In some embodiments, the metal-containing compound comprises zinc octoate. In particular embodiments, the molar ratio of zinc complexed with octanoic acid is not 1:2. In some embodiments, the ratio is from about 2.1:3 to about 1.97:3 (see, for example, U.S. Pat. No. 8,246,813, the entire contents of which are incorporated into the present disclosure in their entirety).

In accordance with the present disclosure, carboxylates may be derived from various carboxylic acids. In some embodiments, the carboxylic acids may comprise from 1 to about 20 carbon atoms. The carboxylic acids include various hydroxyl acids and amino acids, such as glycine, aspartic acid, citric acid, etc. In some embodiments, the carboxylic acid is selected from the group consisting of carbonic acid, methanoic acid, ethanoic acid, propanoic acid, butanoic acid, pentanoic acid, hexanoic acid, heptanoic acid, octanoic acid, 2-ethyhexanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and any combination thereof.

In additional embodiments, the carboxylic acid is selected from branched neo-acids, such as neodecanoic acid. In some embodiments, the carboxylic acid is selected from an aromatic acid, such as benzoic acid and/or naphthoic acid, wherein the aromatic rings may include alkyl and alkoxy groups attached to them.

The asphalt disclosed herein may be, but does not need to be, polymer-treated asphalt. Depending upon the desired application of the asphalt, one or more polymers may be added thereto to modify certain performance characteristics. The polymers include, but are not limited to, various rubbers, thermoplastic elastomers, elastomeric polymers, and any combination thereof. Elastomeric polymers include synthetic and/or natural rubbers, such as, but not limited to, polybutadiene, ethylene/vinyl acetate copolymers, polyacrylates, styrene-butadiene copolymers, polyolefins, and styrene-isoprene copolymers. In some embodiments, the polymers comprise conjugated diene units and/or aromatic monovinyl hydrocarbon units. In certain embodiments, the polymer is PPA.

The polymers may be crosslinked or may be free of crosslinks. One of ordinary skill in the art understands the types of agents that can be used to crosslink polymers such as, but not limited to, organic sulfur-containing crosslinkers, elemental sulfur crosslinkers, etc.

The asphalt may comprise from about 0.1 weight % to about 10 weight % of the polymer. In some embodiments, the asphalt comprises from about 0.1 weight % to about 5 weight % of the polymer. In certain embodiments, the asphalt comprises about 1 weight % of the polymer.

In accordance with certain embodiments of the present disclosure, PPA is added to the asphalt. Acid modification of the asphalt generally results in asphalt compositions that exhibit improved low temperature performance. The asphalt composition may include less than or equal to about 10 wt. % acid. In some embodiments, the asphalt composition includes less than or equal to about 5 wt. % acid. In some embodiments, the asphalt composition includes less than or equal to about 3 wt. % acid. In some embodiments, the asphalt composition includes less than or about 1 wt. % acid and may include from about 0.01 wt. % to about 1 wt. % acid, from about 0.05 wt. % to about 1 wt. % acid, or from about 0.1 wt. % to about 1 wt. % acid, for example.

The compositions disclosed herein can optionally include one or more solvents. The solvent may be a polar solvent, for example. In some embodiments, the solvent is selected from the group consisting of diethylene glycol, 2-butoxyethanol, propylene glycol, monoethanol amine, and any combination thereof.

The compositions disclosed herein can optionally include one or more additives. Suitable additives include, but are not limited to, asphaltene inhibitors, paraffin inhibitors, corrosion inhibitors, scale inhibitors, emulsifiers, water clarifiers, dispersants, emulsion breakers, gas hydrate inhibitors, biocides, pH modifiers, surfactants, and combinations thereof. Additional additives include sulfonating agents, crosslinking agents or combinations thereof. The asphalt composition may include from about 0.001 wt. % to about 5 wt. % of total additives or from about 0.01 wt. % to about 3 wt. % of total additives, for example.

The crosslinking agents may be activators (e.g., zinc oxide), accelerators, such as sulfur compounds (e.g., mercaptobenzothizole (MBT)) or both accelerators and activators, such as a zinc salt of MBT, for example.

The additives may further include unsaturated functional monomers, unsaturated carboxylic acids, unsaturated dicarboxylic acids, unsaturated anhydrides, unsaturated esters, unsaturated amides or combinations thereof, for example.

The inventors discovered that certain components of the compositions display synergy when used to scavenge hydrogen sulfide from asphalt, including polymer-treated asphalt, such as PPA-treated asphalt. Specifically, the inventors discovered synergy between certain sulfide-scavenging agents and certain metal-containing compounds. For example, synergy was discovered when the metal-containing compound comprised a metal-carboxylate and when the sulfide-scavenging agent comprised the 1,3,5-triazine derivative of Formula I, where each of $R_1$, $R_2$ and $R_3$ were a functionalized alkyl group.

Preparation Methods

In accordance with certain embodiments of the present disclosure, the compositions are made with anhydrous sulfide-scavenging agents to facilitate handling of PPA-treated asphalt and asphalt mixtures at temperatures around 250° C. In some embodiments, the temperature of the asphalt or asphalt mixture is less than about 200° C. In some embodiments, the temperature of the asphalt or asphalt mixture is less than about 150° C. In some embodiments, the temperature of the asphalt or asphalt mixture is less than about 100° C. In some embodiments, the temperature of the asphalt or asphalt mixture is less than about 90° C.

Illustrative, non-limiting methods of forming such asphalt compositions are described below. For example, in one embodiment, asphalt is heated in a first mixing vessel to a temperature of from about 140° C. to 205° C. The asphalt concentrate may then be transferred to a second mixing vessel or remain in the first mixing vessel.

PPA (or any other polymer disclosed herein) may be added to the mixing vessel. The polymer is added in a timed release sufficient to avoid foaming, such as from about 20 minutes to about 1 hour, for example. The polymer, however, can be added at any point in the process and to any vessel or conduit in the process. For example, the polymer can be added to a first or second mixing vessel or to a conduit operably connecting the first and second mixing vessels.

The sulfide-scavenging agent may then be added. The metal-containing compound may be added before, after, and/or with the sulfide-scavenging agent. The sulfide-scavenging agent and/or metal-containing compound can be added before, after, and/or when the polymer is added. The addition of the sulfide-scavenging agent and/or the metal-containing compound may occur with mixing for about 15 minutes to about 10 hours.

Product Applications

The asphalt compositions described herein can be used for many applications, such as road paving, sealing, water proofing, asphalt cement and/or roofing, for example.

The compounds, compositions, methods, and processes will be better understood by reference to the following examples, which are intended to be illustrative, and not limiting upon the scope of the present disclosure.

EXAMPLES

Sulfide emissions from PPA-treated asphalt were measured to examine the effectiveness of various sulfide scavengers. All $H_2S$ levels reported below and observed were measured by modified ASTM D5705 at annotated temperature and residual time.

The $H_2S$ testing was conducted by adding 1 wt. % PPA to asphalt and keeping the mixture at 150° C. for 24 hours to allow any $H_2S$ release. At the end of this 24 hour period, the vapor phase $H_2S$ concentration of sample was determined and recorded as initial $H_2S$. The composition comprising the sulfide-scavenging agent and metal-containing compound was then added to this PPA-treated asphalt sample, and the sample was kept at 150° C. for another 24 or 48 hours. The vapor phase $H_2S$ after this 24 or 48 hour period was measured and reported as final $H_2S$.

In a first set of experiments, the composition comprised copper acetate and a 1,3,5-triazine derivative of Formula I, where each of $R_1$, $R_2$ and $R_3$ were $CH_2CH_2OH$. Results are shown in Tables 1-3.

TABLE 1

95 weight % solvent diluted triazine with 5 weight % copper acetate

| Sample | After PPA H2S Level/ppm | RXN Ratio | Dosage ppm | Final H2S ppm | Reduction |
|---|---|---|---|---|---|
| 1 | 5000 | 0 | 0 | 5000 | 0% |
| 2 | 5000 | 0.4 | 2000 | 1900 | 62% |
| 3 | 5000 | 0.8 | 4000 | 800 | 84% |
| 4 | 5000 | 1.2 | 6000 | 300 | 94% |
| 5 | 5000 | 1.6 | 8000 | 0 | 100% |

TABLE 2

92.5 weight % solvent diluted triazine with 7.5 weight % copper acetate

| Sample | After PPA H2S Level/ppm | RXN Ratio | Dosage ppm | Final H2S ppm | Reduction |
|---|---|---|---|---|---|
| 1 | 5500 | 0 | 0 | 5500 | 0% |
| 2 | 5500 | 0.4 | 2200 | 1800 | 67% |
| 3 | 5500 | 0.8 | 4400 | 480 | 91% |
| 4 | 5500 | 1 | 5500 | 0 | 100% |
| 5 | 5500 | 1.2 | 6600 | 0 | 100% |
| 6 | 5500 | 1.4 | 7700 | 0 | 100% |

TABLE 3

90 weight % solvent diluted triazine with 10 weight % copper acetate

| Sample | After PPA H2S Level/ppm | RXN Ratio | Dosage ppm | Final H2S ppm | Reduction |
|---|---|---|---|---|---|
| 1 | 5500 | 0 | 0 | 5500 | 0% |
| 2 | 5500 | 0.4 | 2200 | 2100 | 62% |
| 3 | 5500 | 0.6 | 3300 | 730 | 87% |
| 4 | 5500 | 0.8 | 4400 | 150 | 97% |
| 5 | 5500 | 1 | 5500 | 0 | 100% |
| 6 | 5500 | 1.2 | 6600 | 0 | 100% |

Similar experiments to those above were carried out using the triazine without the copper acetate. Results are shown in Table 4. As can be seen, the mixture of the triazine and copper acetate outperformed triazine alone.

TABLE 4

95 weight % solvent diluted triazine

| Sample | Additives | Initial H2S/ppm | Rxn Ratio | Dosage/ppm | Final H2S/ppm | Reduction |
|---|---|---|---|---|---|---|
| 1 | Blank | 7500 | 0 | 0 | 9500 | −27% |
| 2 |  | 7500 | 0 | 0 | 7500 | 0% |
| 9 | Solvent | 7500 | 1 | 7500 | 400 | 95% |
| 10 | diluted | 7500 | 1 | 7500 | 620 | 92% |
| 11 | triazine | 7500 | 2 | 15000 | 315 | 96% |
| 12 |  | 7500 | 2 | 15000 | 390 | 95% |
| 13 |  | 7500 | 3 | 22500 | 85 | 99% |
| 14 |  | 7500 | 3 | 22500 | 100 | 99% |
| 15 |  | 7500 | 3.5 | 26250 | 65 | 99% |

In an additional set of experiments, one-gallon containers containing asphalt samples were placed in an oven at around 300° F. for at least about 10 hours to allow the samples to flow. Once the samples were sufficiently heated, a mechanical shaker agitated each sample for about 3 minutes to ensure thorough mixing.

Each testing sample was then prepared by transferring about 500 ml asphalt into a quart metal can, which was already pre-dosed with about 0.5 ml of PPA. After the transfer, each can was immediately capped and shaken rigorously to mix the asphalt with the PPA.

The sample cans were then placed back into an oven for at least about 30 minutes to improve the flowability of the asphalt. After reheating, one can was taken out and hand-shaken for about 50 counts followed by measuring of the $H_2S$ amount with a Draeger tube. This amount was recorded as initial $H_2S$. The rest of the cans were then treated with different amounts of additives according to the initial $H_2S$. The dosage of copper acetate was determined by matching the same amount of copper acetate in the blended product.

The treated sample cans were then stored at about 300° F. for about 24 hours. At the end of this period, each can was removed from the oven and hand-shaken for about 50 counts followed by measuring of the $H_2S$ content. This $H_2S$ level was recorded as Final $H_2S$. Results are depicted in Tables 1 and 2.

TABLE 1

| Sample | Initial H2S/ppm | Additives | [1]Rxn Ratio | Dosage | Final H2S/ppm | Reduction % |
|---|---|---|---|---|---|---|
| 1 | 2500 | Blank | N/A | N/A | N/A | N/A |
| 2 | 2500 | 10% copper acetate + 90% water free triazine | 0.5 | 1250 ppm | 590 | 76% |
| 3 | 2500 | 10% copper acetate + 90% water free triazine | 1 | 2500 ppm | 0 | 100% |
| 4 | 2500 | 100% copper acetate | N/A | [2]0.0625 g | 1720 | 31% |
| 5 | 2500 | 100% copper acetate | N/A | [2]0.125 g | 880 | 65% |

[1]The Rxn Ratio was presented as the volume of additive vs Initial $H_2S$. E.g., Rxn Ratio = 1 means 1 vppm additive was added for 1 ppm initial $H_2S$.
[2]The dosage of 100% copper acetate was determined by matching the same amount of copper acetate in the blended product. The detailed calculation was as follows:
Density (10% copper acetate + 90% water free triazine) = 1.204 g/ml $$\text{Copper acetate for Sample 3} = \frac{1250 \text{ ppm}}{1 \text{ ppm} \cdot \text{L}/\mu\text{L}} \times 0.5\text{L} \times \frac{1.204 \text{ g/ml}}{1000 \ \mu\text{l/ml}} \times 10\% = 0.0625 \text{ g}$$

$$\text{Copper acetate for Sample 4} = \frac{2500 \text{ ppm}}{1 \text{ ppm} \cdot \text{L}/\mu\text{L}} \times 0.5\text{L} \times \frac{1.204 \text{ g/ml}}{1000 \ \mu\text{l/ml}} \times 10\% = 0.125 \text{ g}$$

TABLE 2

| Sample | Initial H2S/ppm | Additives | [1]Rxn Ratio | Dosage | Final H2S/ppm | Reduction % |
|---|---|---|---|---|---|---|
| 1 | 600 | Blank | N/A | N/A | N/A | N/A |
| 2 | 600 | 10% copper acetate + 90% water free triazine | 0.5 | 300 ppm | 130 | 78% |

TABLE 2-continued

| Sample | Initial H2S/ppm | Additives | [1]Rxn Ratio | Dosage | Final H2S/ppm | Reduction % |
|---|---|---|---|---|---|---|
| 3 | 600 | 10% copper acetate + 90% water free triazine | 1 | 600 ppm | 0 | 100% |
| 4 | 600 | 100% copper acetate | N/A | [2]0.0181 g | 460 | 23% |
| 5 | 600 | 100% copper acetate | N/A | [2]0.0361 g | 230 | 62% |

[1] The Rxn Ratio was presented as the volume of additive vs Initial H$_2$S. E.g., Rxn Ratio = 1 means 1 vppm additive was added for 1 ppm initial H$_2$S.
[2] The dosage of 100% copper acetate was determined by matching the same amount of copper acetate in the blended product. The detailed calculation was as follows:
Density (10% copper acetate + 90% water free triazine) = 1.204 g/ml $$\text{Copper acetate for Sample 4} = \frac{300 \text{ ppm}}{1 \text{ ppm} \cdot \text{L}/\mu\text{L}} \times 0.5 \text{ L} \times \frac{1.204 \text{ g/ml}}{1000 \ \mu\text{l/ml}} \times 10\% = 0.0181 \text{ g}$$

$$\text{Copper acetate for Sample 5} = \frac{600 \text{ ppm}}{1 \text{ ppm} \cdot \text{L}/\mu\text{L}} \times 0.5 \text{ L} \times \frac{1.204 \text{ g/ml}}{1000 \ \mu\text{l/ml}} \times 10\% = 0.0361 \text{ g}$$

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Unless expressly stated to the contrary, use of the term "a" is intended to include "at least one" or "one or more." For example, "a metal-containing compound" is intended to include "at least one metal-containing compound" or "one or more metal-containing compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

As used herein, the term "about" refers to the cited value being within the errors arising from the standard deviation found in their respective testing measurements, and if those errors cannot be determined, then "about" refers to within 10% of the cited value.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For example, in some embodiments, a composition as disclosed herein consists essentially of (or consists of) a metal-containing compound and a sulfide-scavenging agent. In some embodiments, a composition as disclosed herein consists essentially of (or consists of) a metal-containing compound, a sulfide-scavenging agent and a solvent. In some embodiments, a composition as disclosed herein consists essentially of (or consists of) a metal-containing compound, a sulfide-scavenging agent, and asphalt. In some embodiments, a composition as disclosed herein consists essentially of (or consists of) a metal-containing compound, a sulfide-scavenging agent, and polymer-treated asphalt. In some embodiments, a composition as disclosed herein consists essentially of (or consists of) a metal-containing compound, a sulfide-scavenging agent, polymer-treated asphalt, and a solvent.

In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A composition for reducing hydrogen sulfide emission from asphalt, comprising:
   (a) a metal-containing compound comprising a member selected from the group consisting of a metal carboxylate, a metal carbonate, and any combination thereof; and
   (b) a sulfide-scavenging agent selected from the group consisting of hexamethylenetetramine and a 1,3,5-triazine derivative of Formula I:

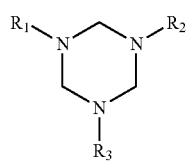

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy, wherein the metal-containing compound does not comprise zinc.

2. The composition of claim 1, further comprising asphalt.

3. The composition of claim 2, wherein the asphalt is polymer-treated asphalt.

4. The composition of claim 2, wherein the asphalt comprises polyphosphoric acid.

5. The composition of claim 1, wherein the sulfide-scavenging agent comprises Formula I, and each of $R^1$, $R^2$, and $R^3$ is independently selected from straight or branched $C_6$-$C_{30}$ alkyl, hydroxyl substituted straight or branched $C_6$-$C_{30}$ alkyl, and straight or branched $C_6$-$C_{30}$ alkoxy substituted with straight or branched $C_1$-$C_{30}$ alkoxy.

6. The composition of claim 1, wherein the sulfide-scavenging agent comprises Formula I, and each of $R^1$, $R^2$, and $R^3$ is selected from $C_1$-$C_9$ straight or branched alkyl.

7. The composition of claim 1, wherein the sulfide-scavenging agent comprises Formula I, and each of $R^1$, $R^2$, and $R^3$ is the same substituent.

8. The composition of claim 1, wherein $R^1$ is —$CH_2CH_2OH$, $R^2$ is —$CH_2CH_2OH$, and $R^3$ is-$CH_2CH_2OH$.

9. The composition of claim 1, wherein the sulfide-scavenging agent is hexamethylenetetramine.

10. The composition of claim 1, further comprising a polar solvent selected from the group consisting of diethylene glycol, 2-butoxyethanol, propylene glycol, monoethanol amine, and any combination thereof.

11. The composition of claim 1, wherein the composition comprises the following weight percentages of each component based on the total weight of the composition: about 10 weight % to about 90 weight % of the sulfide-scavenging agent, about 1 weight % to about 50 weight % of the metal-containing compound, and optionally about 10 weight % to about 90 weight % of a solvent.

12. The composition of claim 3, wherein the asphalt comprises about 0.1 weight % to about 10 weight % of the polymer based on the total weight of the asphalt.

13. The composition of claim 1, wherein the metal of the metal-containing compound is selected from the group consisting of Cu (II), Fe (II), Ni (II), Co (II), Mn (II), Ca (II), Mg (II), and any combination thereof.

14. The composition of claim 1, wherein the metal-containing compound is selected from the group consisting of copper acetate, copper bis-glycinate, copper 2-ethylhexanoate, iron 2-ethylhexanoate and any combination thereof.

15. The composition of claim 1, wherein the composition, the metal-containing compound and/or the sulfide-scavenging agent is anhydrous.

16. A method of reducing hydrogen sulfide emission from asphalt, comprising:
    combining asphalt with a composition, the composition comprising a metal-containing compound comprising a member selected from the group consisting of a metal carboxylate, a metal carbonate, and any combination thereof, and a sulfide-scavenging agent selected from the group consisting of hexamethylenetetramine and a 1,3,5-triazine derivative of Formula I:

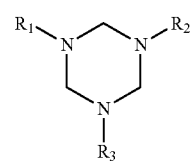

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy.

17. The method of claim 16, wherein the sulfide-scavenging agent comprises Formula I, and each of $R^1$, $R^2$, and $R^3$ is independently selected from straight or branched $C_6$-$C_{30}$ alkyl, hydroxyl substituted straight or branched $C_6$-$C_{30}$ alkyl, and straight or branched $C_6$-$C_{30}$ alkoxy substituted with straight or branched $C_1$-$C_{30}$ alkoxy.

18. A composition, comprising:
    (a) asphalt;
    (b) a metal-containing compound comprising a member selected from the group consisting of a metal carboxylate, a metal carbonate, and any combination thereof; and
    (c) a sulfide-scavenging agent selected from the group consisting of hexamethylenetetramine and a 1,3,5-triazine derivative of Formula I:

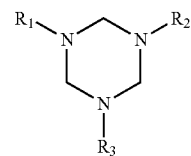

wherein each of $R^1$, $R^2$, and $R^3$ is independently selected at each occurrence from hydrogen, straight or branched $C_1$-$C_{30}$ alkyl, hydroxyl substituted straight or branched $C_1$-$C_{30}$ alkyl, and straight or branched $C_1$-$C_{30}$ alkyl substituted with straight or branched $C_1$-$C_{30}$ alkoxy.

19. The composition of claim 18, wherein the metal-containing compound is copper acetate.

* * * * *

UNITED STATES PATENT AND TRADEMARK OFFICE
CERTIFICATE OF CORRECTION

| | | |
|---|---|---|
| PATENT NO. | : 11,981,817 B2 | Page 1 of 1 |
| APPLICATION NO. | : 16/801726 | |
| DATED | : May 14, 2024 | |
| INVENTOR(S) | : Xiaowei Tong et al. | |

It is certified that error appears in the above-identified patent and that said Letters Patent is hereby corrected as shown below:

On the Title Page

Item (56), Column 2, second reference under the Other Publications section, delete "Internatonal" and insert --International--.

In the Claims

Column 15, In Claim 8, Line 35, delete "is-CH2CH2OH." and insert --is —$CH_2CH_2OH$.--.

Signed and Sealed this
Tenth Day of September, 2024

Katherine Kelly Vidal
*Director of the United States Patent and Trademark Office*